3,197,540
WAKE SIMULATOR

Myron N. Kaufman, Massapequa, and Irwin May, East Meadow, N.Y., assignors, by direct and mesne assignments, to the United States of America as represented by the Secretary of the Navy
Filed June 7, 1962, Ser. No. 200,899
1 Claim. (Cl. 35—10.4)

The following invention pertains to simulation devices and is particularly directed towards a device for simulating the wakes and wake echoes of different types of surface water craft.

The present invention provides an apparatus for training submarine personnel in the detection of water craft by sonic apparatus including the use of receiving devices adapted to detect and reproduce the various sounds made by or reflected from a surface water craft. By means of these devices it is possible to accurately locate such water craft and destroy them if necessary. In the use of sonic apparatus of this type the signals are transmitted and echoes from a water craft are picked up. In addition echoes from the wake of water craft are also picked up. These wake echoes while very similar to echoes from an actual target watercraft are not quite identical. The differences are small and require extensive training in recognition of the different echo signals. The instant invention provides an accurate simulation of wake echoes as differentiated from water craft target echoes.

An object of the present invention therefore, is the provision of a new and improved apparatus for simulating wake echoes.

A further object of the instant invention is to provide a novel means for accurately simulating wake echoes.

A further object of the instant invention is to provide apparatus for accurately simulating wake echo in a simple low cost device.

Other objects and many of the attendant advantages of this invention will be readily appreciated as the same becomes better understood by reference to the following detailed description when considered in connection with the accompanying drawings wherein.

Referring now to FIGS. 1a–1d, the wake simulator is utilized for simulating wake effects for a non-scanning, non-stationary type of sonar in a device for training sonar operators to recognize the visual and aural characteristics of a wake. Target information is generated in an analog track generator 10 with the current position of the target (X, Y) generated as shaft positions $X_t$ and $Y_t$, 12 and 14 respectively. This shaft information is translated into digital form and sampled by sampling circuitry 16 and then stored in digital form on drum 18. The sequence and timing of the right signal for proper precession of the stored information is achieved by the use of a clock wheel 20 coupled directly to the drum shaft 22. The output of the clock wheel is then applied to the drum timing circuit 24 which applies timing signals to the age sweep and shape circuits 26 and also to the sampling circuit 16. The information stored on the drum is absolute position which permits the sonar station to move about since the relative position that is continuously derived is based on the absolute track stored. The X, Y, target information read from the drum is subtracted digitally from the current sonar X, Y, information position and continuous digital to analog conversions are made by X digital to analog converter 28 and Y digital to analog converter 30. The present position of the sonar is generated by position generator 32 and added together with the target X and Y positions in add circuits 34 and 36.

The track generators for both the targets 10 and the own ship sonar 32 are analog in nature with output shafts driving digital code discs 38 and 40 respectively. In this way the positional information is converted directly from a shaft position to a parallel digital number to the accuracy required. It is not necessary to generate digital track since the parameters of interest (the position of the target and the own ship sonar) should not be based on a very accurate integration of the velocity. This is a realistic approach and is consistent with the actual operational situation. Based on a known starting position, speed and heading the navigator cannot with any great degree of accuracy predict his track because of tides, winds, and the accuracy of his own inputs.

Figure 2:
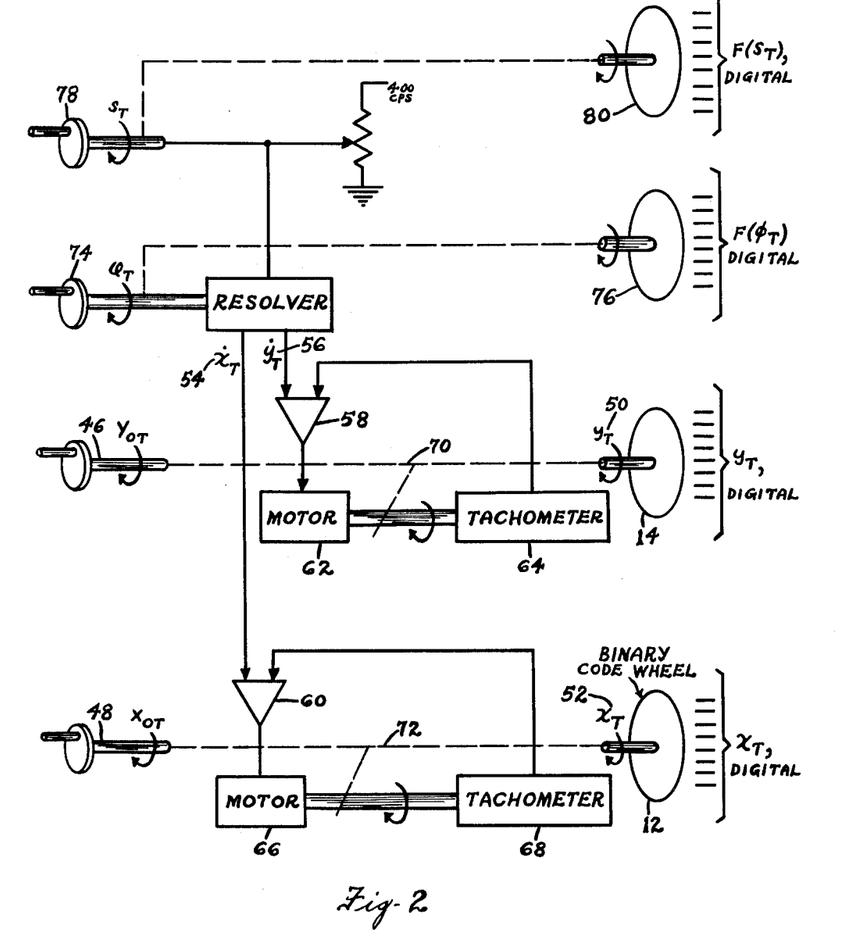
FIG. 2 is a block diagram of the target-track generator.

Both the target track generator 10 and the sonar track generator 32 are similar. The operator controlled inputs are speeds, heading, initial position in Y and X (north-south and east-west). The initial position controls $Y_{ot}46$ and $X_{ot}48$ are coupled via a manually controlled clutch to the associated output shafts $Y_t$ and $X_t$, 50 and 52 respectively. Initially the position is set by the operator. The shaft is appropriately positioned correctly. Based on the operator controlled speed and heading inputs, the north-south, eact-west velocities ($\dot{y}_t, \dot{x}_t$,) 54 and 56 are generated as shown. These velocity vectors are coupled via a drive buffer amplifier, 58 and 60 to a rate servo consisting of a mechanically coupled motor-tachometer 62, 64, and 66, 68, respectively. The motor speed is controlled with considerable accuracy by the input signal based on the speed-voltage linearity characteristics of the tachometer. The output shaft of the motor is coupled via an appropriate gear train 70 and 72 respectively, to the output shaft in both the y and x channels. It should be noted that in addition to the X, Y, position information, it is also required to generate digitally the heading information and the speed information. The input heading shaft is coupled directly to an output heading shaft which turns an associated binary code wheel, the input heading shaft being $\phi_t74$ and the output heading digital shaft being 76. The input speed shaft 78 is connected directly to an output speed shaft binary code wheel 80. For the purposes of computation, it is more convenient to store some function of this speed $F(S_t)$ rather than the speed directly. This relationship between the target speed and $F(S_t)$ is derived directly in the associated code disc 80.

A preferred embodiment of the surface of the drum storage 18 is constructed of a Hypalon material impregnated with magnetic particles. The physical characteristics of this drum in the preferred embodiment which is dictated by design considerations is as follows: Drum diameter 2 inches, drum rotational speed 5 revolutions per second, maximum access time 0.2 second, peripheral speed 31.4 inches per second, sampling rate 5 seconds, total drum storage 15 minutes. The characteristics of this drum are based upon recommended maximum speeds for minimum drum surface wear considerations and access times based upon the speed of sound in water. Most typical sonar receivers are blocked for a time which is equivalent to approximately 200 yards considering that sound travels at 5,000 feet per second in water. The drum diameter of 2 inches permits 180 samples taken at 5 second increments to be placed around the periphery of the drum, which at a 5 second sample rate represents a target movement of approximately 50 yards at 18 knots. This 2 inch diameter drum allows 12 bits per word storage which is equivalent to a 49 yard accuracy in a 100 mile square area, which is consistent with the sampling rate indicated. Fifteen minutes of storage is considered adequate based on the attenuation rate of the wake reflection characteristics which is approximately five db per minute which allows for a total wake strength variation based on age consideration of approximately 75 db. Assuming the typical sonar beam angle of 10 degrees the first target moving at a nominal speed of 18 knots will be represented by a discrete track with at least one sample in each drum receiver beam angle for distances greater than 330 yards from the sonar transducer. In order to insure at least one sample per beam width regardless of target range, discrete samples of target bearing must be spread by an angle consistent with the maximum displacement between the adjacent samples (at maximum target speed). The bearing angle must be spread by an amount inversely proportional to the range and this may be done by widening the $\theta$ ($p$) pulse as a function of $1/p$, as indicated in FIGS. 1a–1f.

Figure 1A:
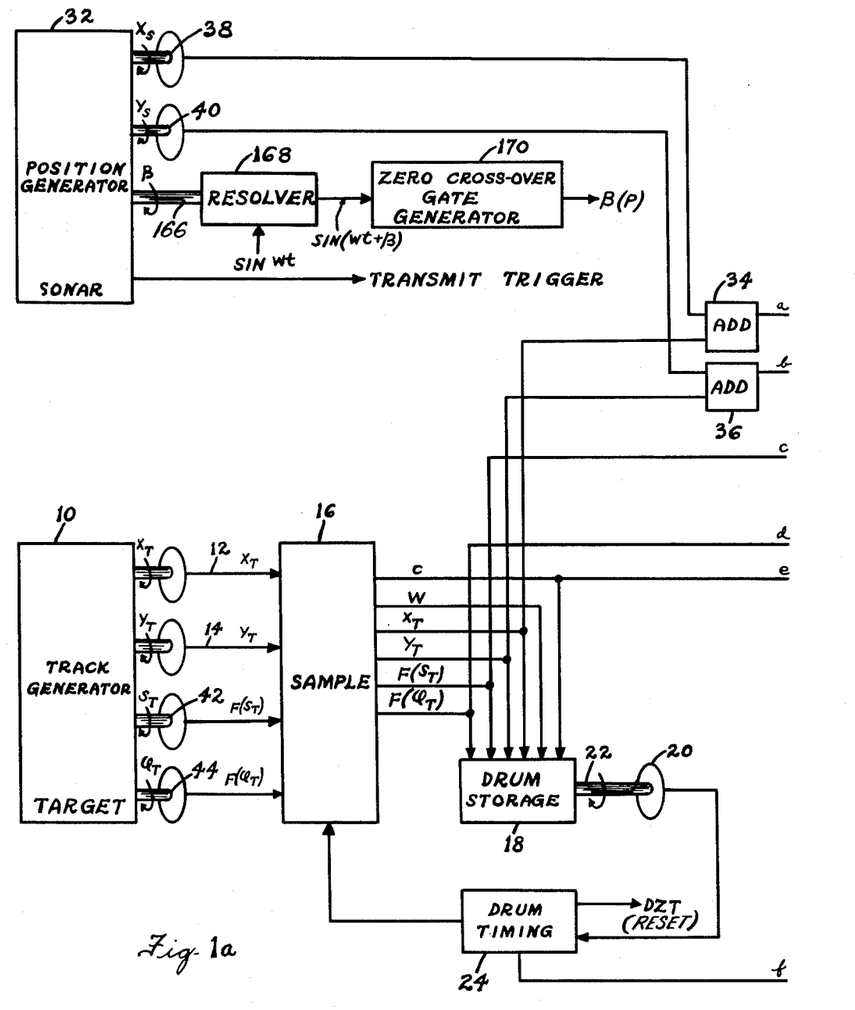
FIGS. 1a–1f is a block diagram of the over-all wake simulator.
Figure 1B:
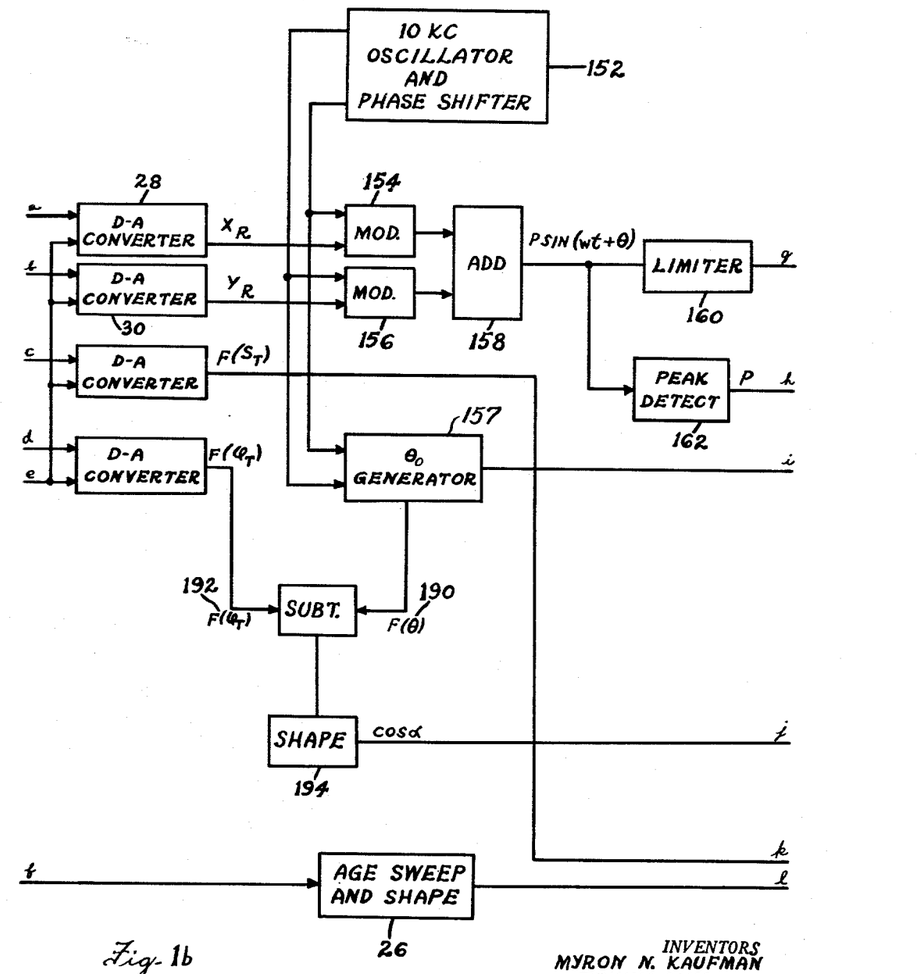
Figure 1C:
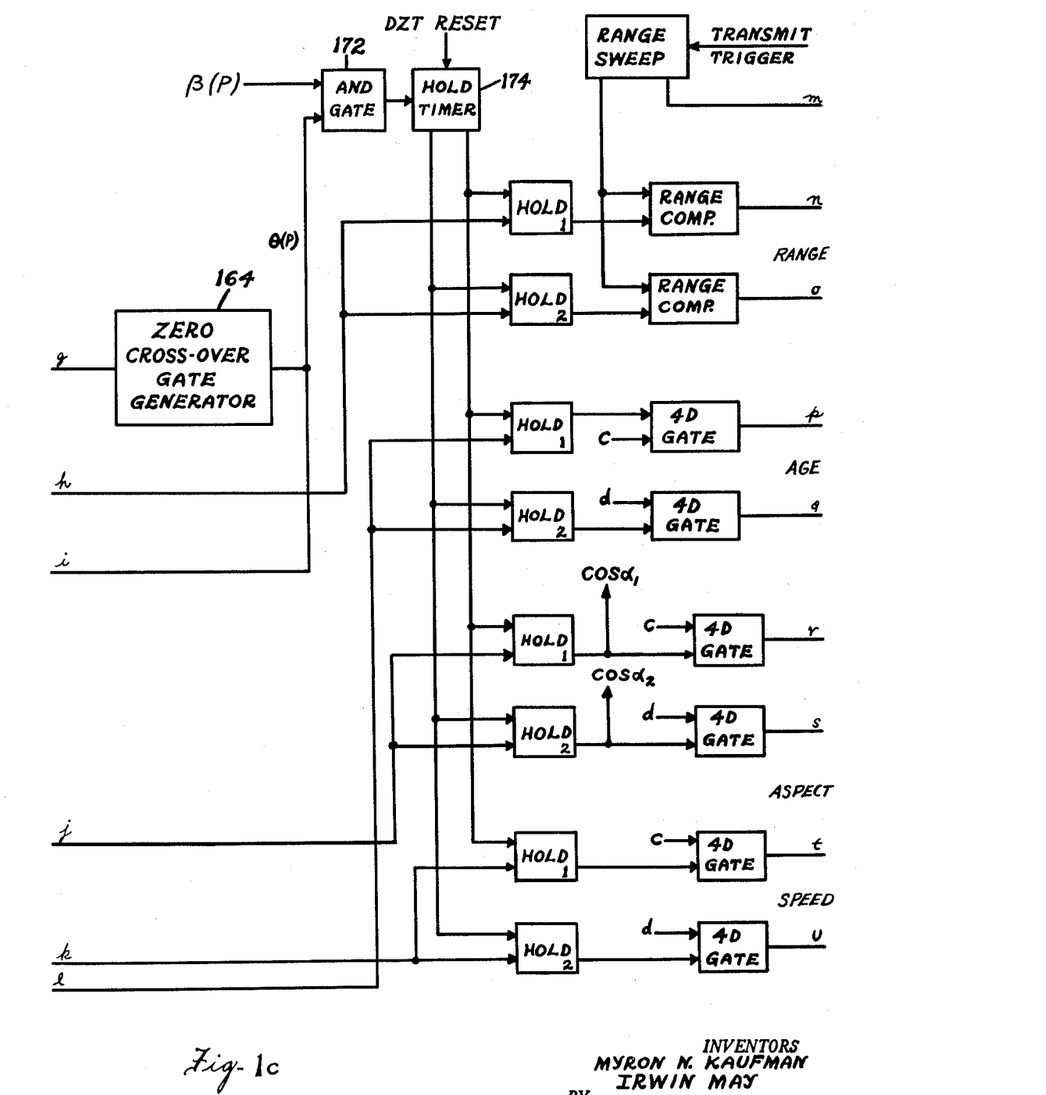
Figures 1D, 1E, 1F:
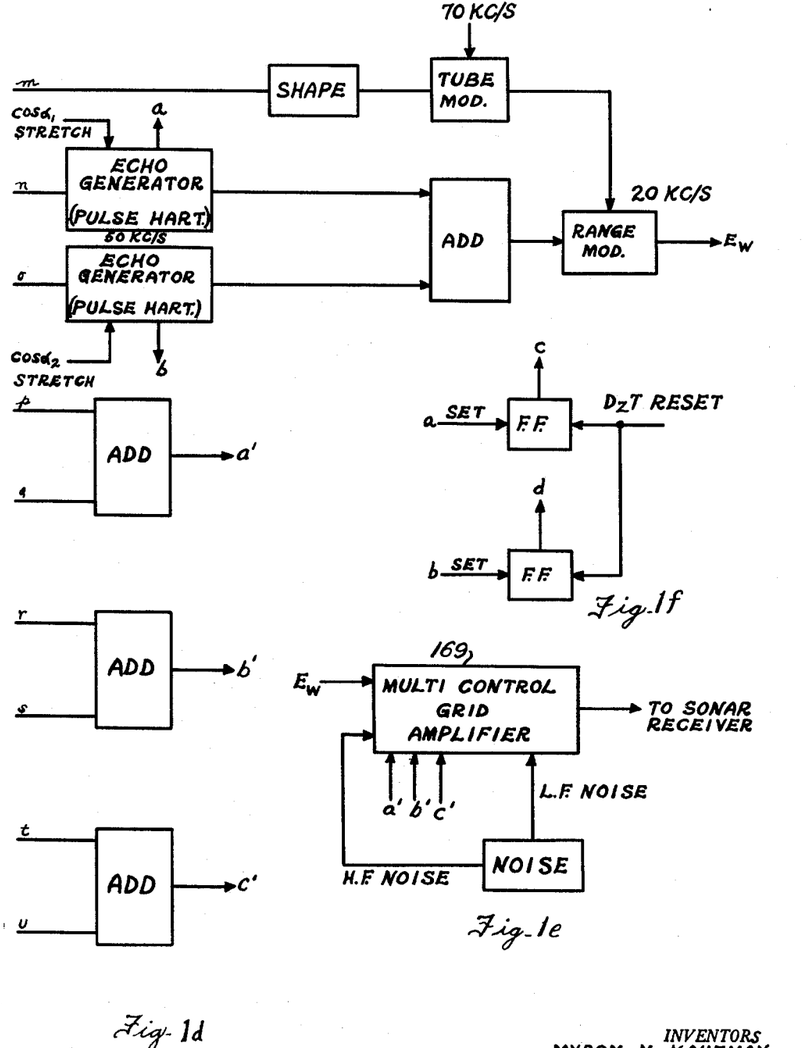

The signals representing age, aspect and speed, appear between lines $p$–$q$, $r$–$s$, and $t$–$u$ respectively (see FIG. 1c).

Figure 3:
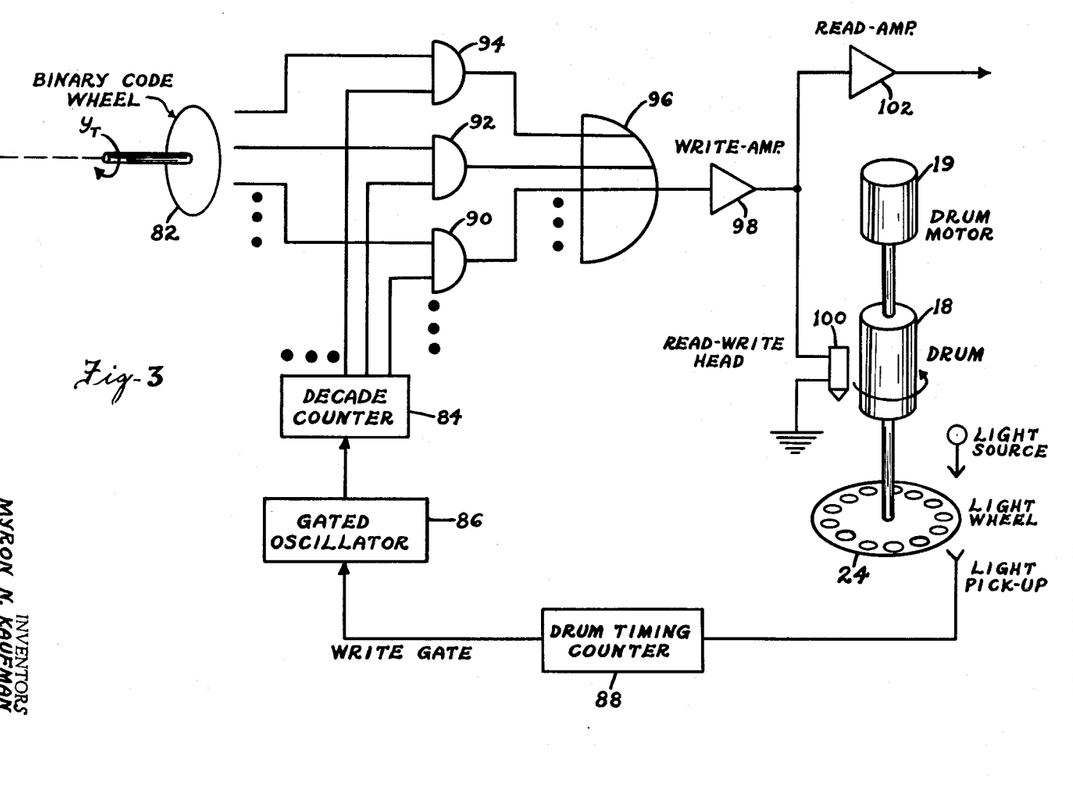
FIG. 3 is a block diagram of the drum layout and associated electronic circuitry.

FIG. 3 is a block diagram of the drum layout and associated electronics for a single channel. The binary number comes off the code wheel 82 in parallel fashion and based on a fixed number of revolutions of the drum 18, the drum timing counter 88 generates a write gate which keys a gated oscillator 86. The oscillator output is routed to a counter 84 which sequentially samples the AND gate 90, 92, 94 associated with each one of the binary code wheel outputs. These AND gate outputs are routed to the OR gate 96, the resulting output being a serial binary number representing the $y$ position of the target. This output is passed through a write amplifier 98 which sets the appropriate levels and feeds the read-write head 100 which is in contact with the drum. It should be noted that the read amplifier 102 is tied to the read-write head 100 and consequently to the output of the write amplifier 98. This arrangement requires that the read amplifier have a fast recovery time so that no more than the first two samples after the write interval are blocked by the relatively large write amplifier output into the read-write head (i.e., the large write-amplifier output, which is also fed to the read-amplifier, saturates, or blocks, the read-amplifier input circuit). The details of the construction between the motor 19 and the drum 18, the drum and the light wheel 24 are not shown. It should be noted, however, that a step down gear train is included between the synchronous motor and the drum with an appropriate flexible coupling to cut down the speed perturbations. It is not necessary that the light wheel have a one to one hole correspondence with the number of words to be written on the drum. Although this is possible a gear up between the drum and the light source results in a simpler construction for the light wheel in that the holes may be larger and the construction simpler. The inclusion of a reference channel on the drum in synchronism with the input information makes the effects of drum speed variations less important.

Figure 4:
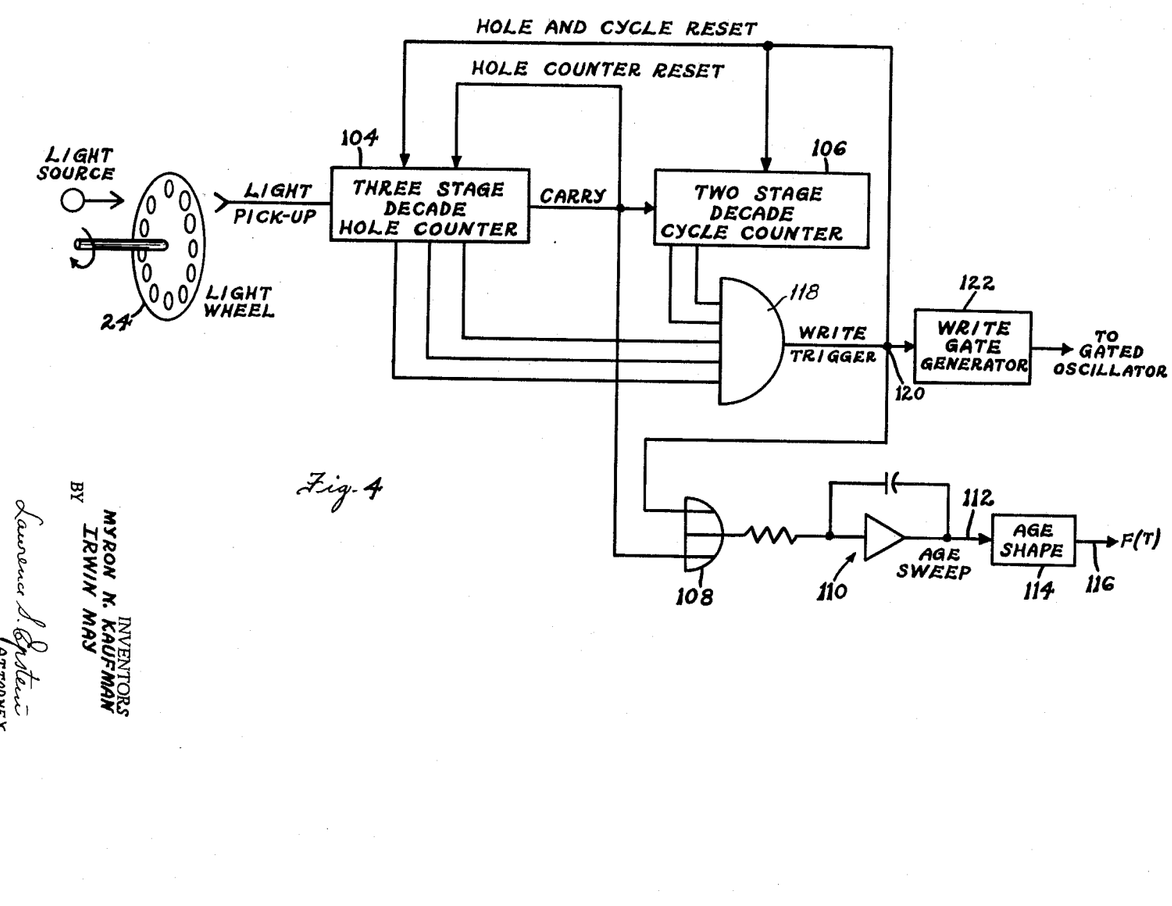
FIG. 4 is a block diagram of the drum timing and wake age circuitry.

The drum timing network and the wake age generation network is depicted in block form, FIG. 4. The light wheel 24 driven by the storage drum 18 generates the timing pulses which are passed into a 3 stage decade hole counter 104. The hole counter is preset to the number of the total samples required to be stored in the drum 18, in this case 180. On achieving a count of 180, a carry pulse is generated from the hole counter which is passed to a two stage cycle counter 106 and in addition resets the hole counter back to zero. The carry pulse is routed to an OR gate 108 and passed into an integrator 110 which is reset and gated each carry pulse interval. The output of this integrator, called the Age Sweep 112, is a saw tooth repeated each complete drum rotation. The Age Sweep 112 is passed through a shaper 114 which converts the linear saw tooth to an exponential function which is periodic at the drum rate. This function is called F(T) 116 as indicated. The pulses coming out of the 3 stage hole counter 104 occur at a $2/10$ of a second rate which is the time for one complete rotation of the drum. It is required to generate a write trigger approximately every 5 seconds. Every 24 revolutions of the drum an output from the two stage cycle counter is generated (indicating the proper number of rotations) and passed to the AND gate 118 as shown. The other three inputs to the AND gate 118 are generated in the hole counter at one count less than a full revolution so that the AND gate output 120 (called write trigger), is generated every 24 complete rotations and 179 holes. This timing precludes the possibility of one piece being placed on top of another and insures the sequential processing of the stored data. The write trigger is utilized to reset both the hole counter and the cycle counter to zero at which time the operation is repeated. The write trigger is used to fire a one shot multivibrator called the write gate generator 122 the output of which is passed (FIG. 3), to the gated oscillator utilized for sampling the binary code wheels. The counting of one slot less than an integral number of revolutions results in the precessing of information in the storage and consequently the information is arranged in time fashion with the newest piece next to the next newest piece, etc. During the write cycle the Age Sweep generator 110 is triggered by the write trigger 120 since the write trigger appears one slot sooner than a carry from the hole counter. This arrangement permits the generation of an age sweep in synchronism with the drum rotation which is precessed in the same fashion as the information so that the newest piece of information stored on the drum always occurs at the same place on the age sweep. Consequently the output from the age shaper 116 is an analog representation of the age of the stored information.

Figure 5:
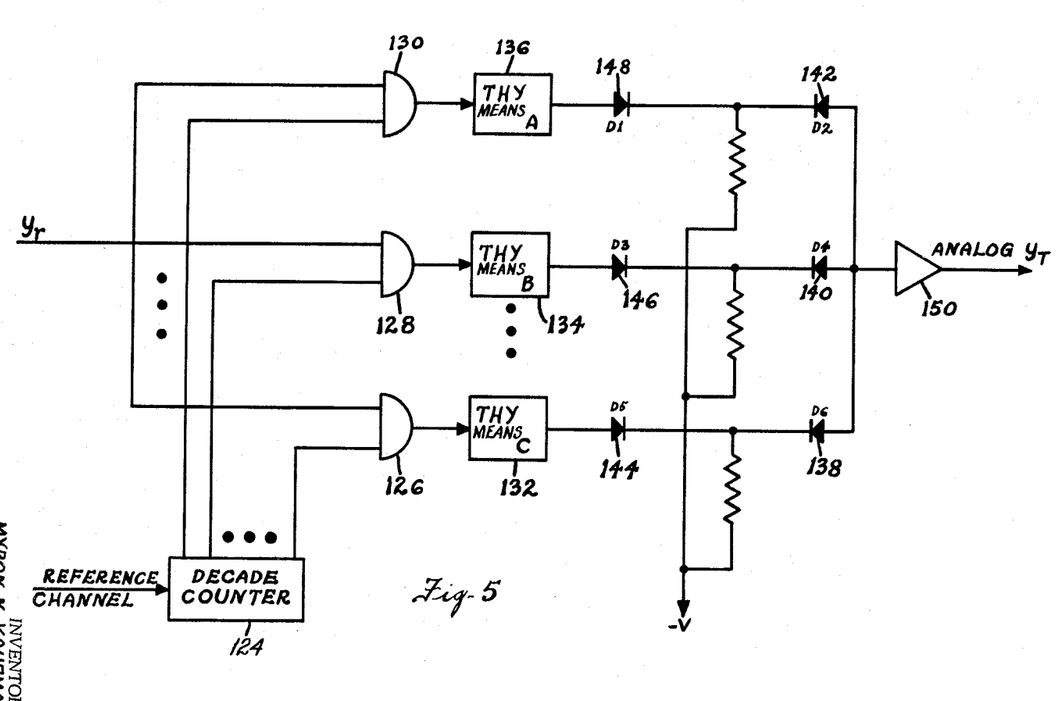
FIG. 5 is a block diagram of the digital to analog converter utilized within the wake simulator.

The digital $x$ and $y$ target position information is subtracted from the equivalent own-ship position information. The subtraction is performed by algebraic addition in ADD elements 34 and 36, FIG. 1a. The resultant relative positions are only of interest providing they correspond to displacements which are less than the maximum sonar detection range. As a consequence, once the difference is derived, the number of bits in the digital number may be pared down since the most significant bits represent out of range targets and are of no consequence. After these relative East-West, North-South digital numbers are derived by simple binary addition, it is desired to convert the digital number to an analog number for further operations. The conversion scheme for one channel is shown in FIG. 5. In order to convert back to analog it is first required to convert the series binary number into a parallel digital number. The reference channel output is routed to a decade counter 124 which supplies, on as many lines as there are bits, one gating signal in synchronism with each bit of the reference word. Each of the counter lines is coupled to an AND gate 126, 128, and 130 respectively and the digital word is interrogated for ones and zeros. The simultaneous occurrence of a counter gate and an information one results in the ignition of the associated thyratron 132, 134, and 136 respectively which remains ignited until the completion of the word. Completion of a word results in the absence of a one coincidence at the input of each of the AND gates, and a corresponding change of state at each output of each of said AND gates. The change in state of each gate results in a corresponding resetting of each associated thyratron means. Dependent on whether or not a thyratron is ignited the associated even number diode 138, 140 and 142 respectively will be conducting. For instance, if the upper most AND gate 130, corresponding to, for example the most significant bit, has a one in synchronism with the first counter gate then the AND gate output will ignite thyratron A, 136 which cut off diode D1 148. When this occurs diode D2, which was previously cut off by the positive voltage applied to the plate of diode D1 148, will conduct and a weighted current dependent on the associated resistor will be routed into the input of the feed back amplifier 150. The arrangement of ones and zeros and the corresponding ON and OFF diodes and their associated currents will result in an analog number, equivalent to the digital number, at the output of the amplifier.

For convenience it is desired to translate the relative $x$ and $y$ into polar coordinate information $\rho$ and $\theta$. The details of this implementation are shown in the main block diagram FIGS. 1a–1d. Two 10 kc. signals, with a 90° phase relationship, are generated at 152 and used to modulate the detected relative $x$ and $y$ information. By means of modulators 154 and 156 the two resultant modulated signals are added directly in adder 158 which corresponds to adding $x+jy$, the vector sum of the two quadrature displacement vectors, and the resultant vector is $\rho < \theta$ as shown. The output includes the bearing angle as the phase angle of the 10 kc. carrier. The amplitude (i.e. $\rho$) is extracted from this total information by a peak detector 162 as indicated. The bearing information is extracted by passing the total output into a limiter 160 which feeds the zero crossover gate generator 164 which puts out narrow pulse each time the input sine wave passes through zero. As noted, the discrete nature of the information stored could result in the loss of information occurring if the displacement between adjacent samples (at maximum target speeds) is greater than the arc determined by the transducer beam width. Obviously this arc is related to the target range and the possibility of missing information is greater at small ranges. By "stretching" the $\theta$ ($p$) zero crossover pulse an amount inversely proportional to range all of the stored information will be retained. The sonar beam angle relative to North which is computed based on the sonar heading angle and the beam angle relative to the bow of the ship is called $\beta$ and is generated as a shaft angle in Own Ship position track generator 32. This shaft 166 is utilized for positioning a resolver 168, the input of which is a 10 kc./s. sine wave. The output of the resolver is $\sin(\omega t + \beta)$, as indicated, which is passed into a zero crossover gate generator 170 identical to the one utilized for the extraction of the $\theta$ crossover pulses. Time coincidence is sought in the two input AND 172 gates to which $\theta$ ($p$) and $\beta$ ($p$) are routed. The sonar beam angle may be simulated by widening or narrowing the $\beta$ ($p$) pulse according to the beam angle requirements. An output from this AND gate indicates that the sonar azimuth angle and the wake bearing angle are identical, which is a necessary requirement for the generation of an echo condition. The output of the AND gate is passed to the hold timer 174 which controls the position and the sequence of the information to be held which will be described. A switching circuit (see FIG. 1f) is responsive to signals generated by the Echo Generators (FIG. 1d) to control proper sequence time gating of the information to be read out of the Hold units by the 4D gate units. See FIG. 1c.

Figure 6:
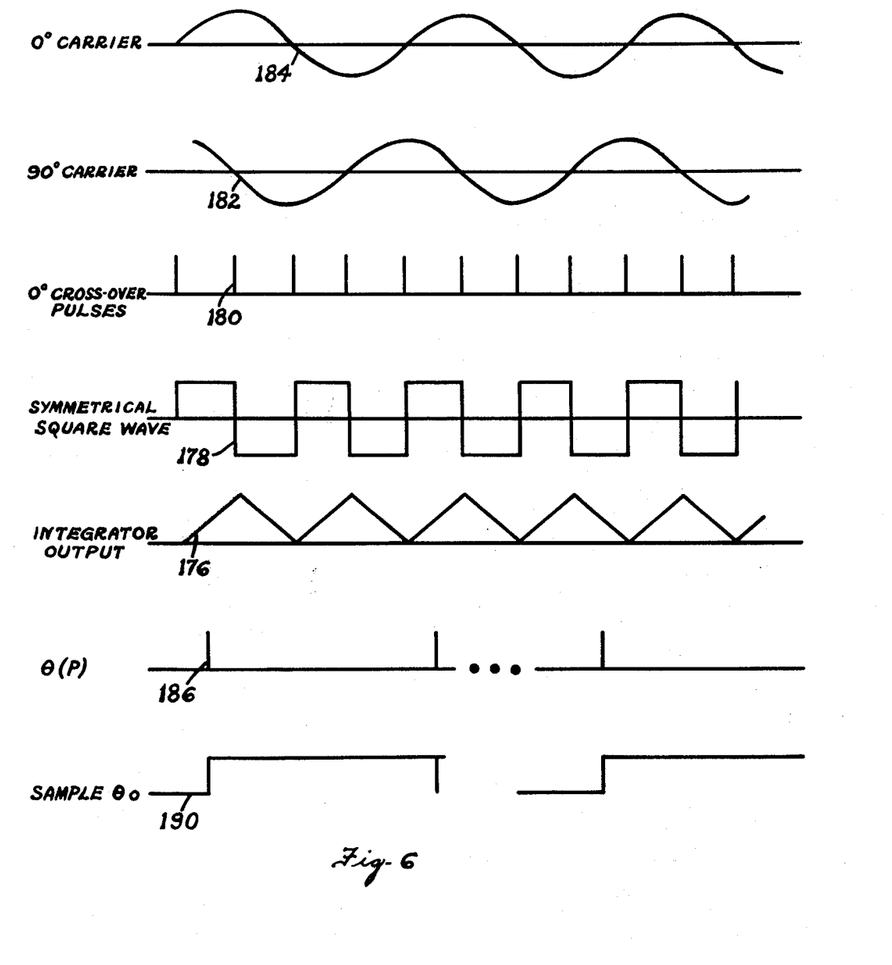
FIG. 6 is a diagram of the wave forms utilized in generation of $\theta$ for cos $\alpha$ computation.

The aspect of the wake with respect to the sonar beam determines the effective width of the wake and consequently affects the wake shadow effect. In addition this angle plays a part in the length of the echo return. For the situation where the wake is perpendicular to the sonar beam no echo stretching will occur. In order to simulate the effect of this angle $\alpha$ a continuous subtraction of the bearing angle and the stored target heading angle must be generated. The target heading angle effect on the stretching and width modulation is repeated every 180°. For example, if the bearing angle is considered to be at 90° it is immaterial whether the heading angle is 0 or 180°. The function that has to be generated is the sine of the aspect angle ($\sin \alpha$), with no need to maintain sign information because of the 180° relationship discussed above. The target heading angle is modified at the binary code wheel 44 as a symmetrical function with 0 amplitude at 0 and 360° approaching a peak linearly at 90° and 180° similar to waveform 176. This information is read from the drum and decoded as shown previously. It is necessary next to generate bearing angle from the function $\theta$ ($p$) 186 which is a pulse function delayed in time directly propotional to the bearing phase angle. FIG. 6 is a timing diagram which indicates the voltage analog corresponding to the bearing angle utilizing the $\theta$ ($p$) pulse 186. The sine wave carriers are obtained from the 10 kc. oscillator phase shifter 152 and the shaping described below is accomplished in the F($\theta$) generator. A 0° and 90° 10 kc./s. carrier 184 and 182 are amplified and limited producing two square waves. The leading edges of both square waves are extracted (differentiation) and a 40 kc./s. pulse train is derived by adding the leading edge pulses 180. A 20 kc./s. symmetrical square wave is generated using a flip flop set and reset by the 40 kc./s. crossover pulses 180. A triangular wave form is generated by integrating the symmetrical square wave 178. The $\theta$ ($p$) pulses are used to determine the sampling time of the integrator output which results in a D.C. voltage corresponding to the bearing angle 190.

Figure 7A:
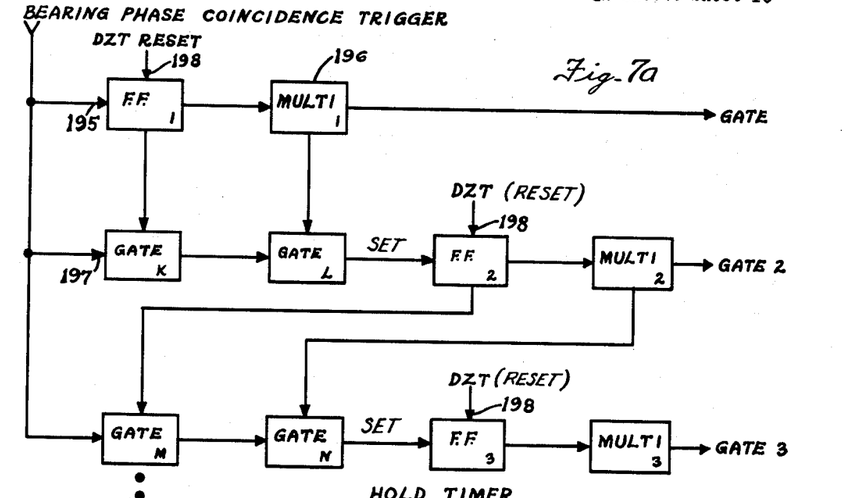
FIGS. 7a and 7b are block schematic diagrams of the hold timer and hold network, respectively.
Figure 7B:
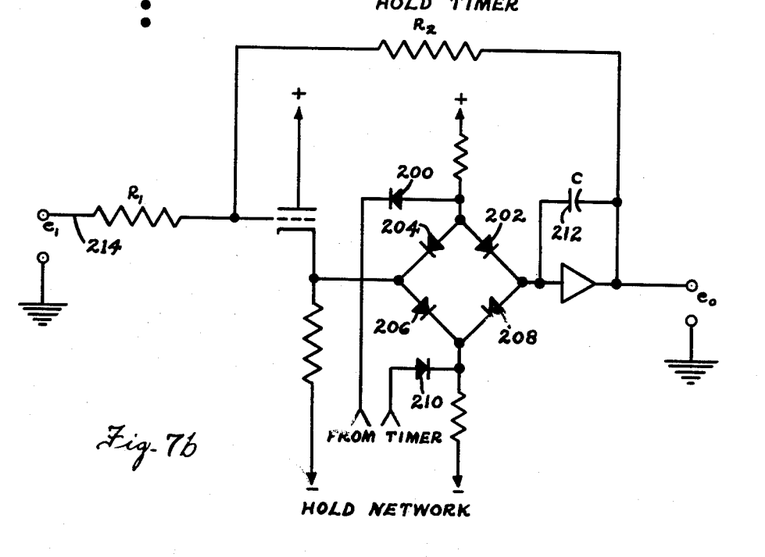

The absence of sign information simplifies the process of generating the $\cos \alpha$ since a simple diode ladder network is used for simulating this function. The $\theta$ voltage 190 and the target heading 192 voltage are subtracted one from another, with a constant D.C. level introduced into the subtractor so that the difference in signal never goes below zero volts. The resultant difference is routed to a diode ladder shaper network 194 and the cosine of the angle is generated. A description of such standard ladder networks may be found in Huskey and Korn, "Computer Handbook," 1st edition, 1962, McGraw-Hill Company (pages 3-66, et seq.). The function that is introduced in the shaper will actually represent a full wave rectified cosine since the sign information is not used. This information is sampled and held in a manner similar to the range and age information. This sampling and the position of the hold network used are controlled by the bearing comparator and the hold time as follows:

A block diagram of the hold timer is shown in FIG. 7a. The purpose of this timer is to route the information such as range, $\cos \alpha$, age and target speed information to the proper hold networks in sequence. The newest information is read from the drum 18 first. At the occurrence of a phase coincidence, the information is gated through as indicated and necessary computations are performed. In addition the first phase coincidence pulse is routed to the hold timer, which opens up the first hold circuit 195 (FIG. 7a) for a period determined by monostable multivibrator 196 (labelled Multi 1). Any additional phases coincidences which occur during the multivibrator ON TIME are ignored. This procedure precludes the possibility of filling all the hold networks with information stored corresponding to very close samples. The first phase coincidence which occurs after the number 1 multivibrator 196 has settled to its stable condition opens the second hold network 197 and the wake information is now fed into the second hold network thereby placing a set signal on the input line of F.F. 2. This operation is continued until all the available holds are filled, or until the drum reaches the starting point (drum zero time). When the drum reaches DZT, the hold timer is reset by the DZT signal 198 as indicated and the sequence is repeated so that the first hold is activated, then the second, etc. This allows the hold networks to be "refreshed" once each drum revolution. If during one drum revolution all the hold networks are filled, then any additional information which is stored on the drum which is in phase coincidences with the sonar beam angle is lost. Even if this rather unlikely situation were to occur the latest most important information would be stored in the hold network. A schematic representation of the hold network is shown in FIG. 7b. This network normally called a boxcar is essentially a gated integrator. The timer gating signals discussed above control the condition of the 6 diode gate 200, 202, 204, 206, 208, 210. When the gate is opened, the input impedance into the operational amplifier is half the back impedance of the diodes. In this mode of operation the operational amplifier is used as an integrator and whatever is stored on the capacitor is held with a time constant consisting of half the diode back impedance and the feedback capacitor 212. When it is required, to either refresh or put new information into the amplifier, the diode gate is closed and new input information $e_1$ 214 is fed into the amplifier directly through the low impedance output of the cathode follower. The capacitor is charged up in rapid time and the gate is sequentially open and the new information is held with the same time constant as indicated.

The operation of the circuits previously described results in a range-attenuated, stretched, wake-echo signal $E_w$, component signal $E_T$ and signals proportional to age, aspect angle and speed of the wake, $a'$, $b'$ and $c'$, respectively. These are combined in the Multi Control Grid Amplifier 169 circuit (see FIG. 1e), the output of which comprises the final wake signal which is displayed by the sonar receiver with which the wake simulator is associated.

Figure 8A:
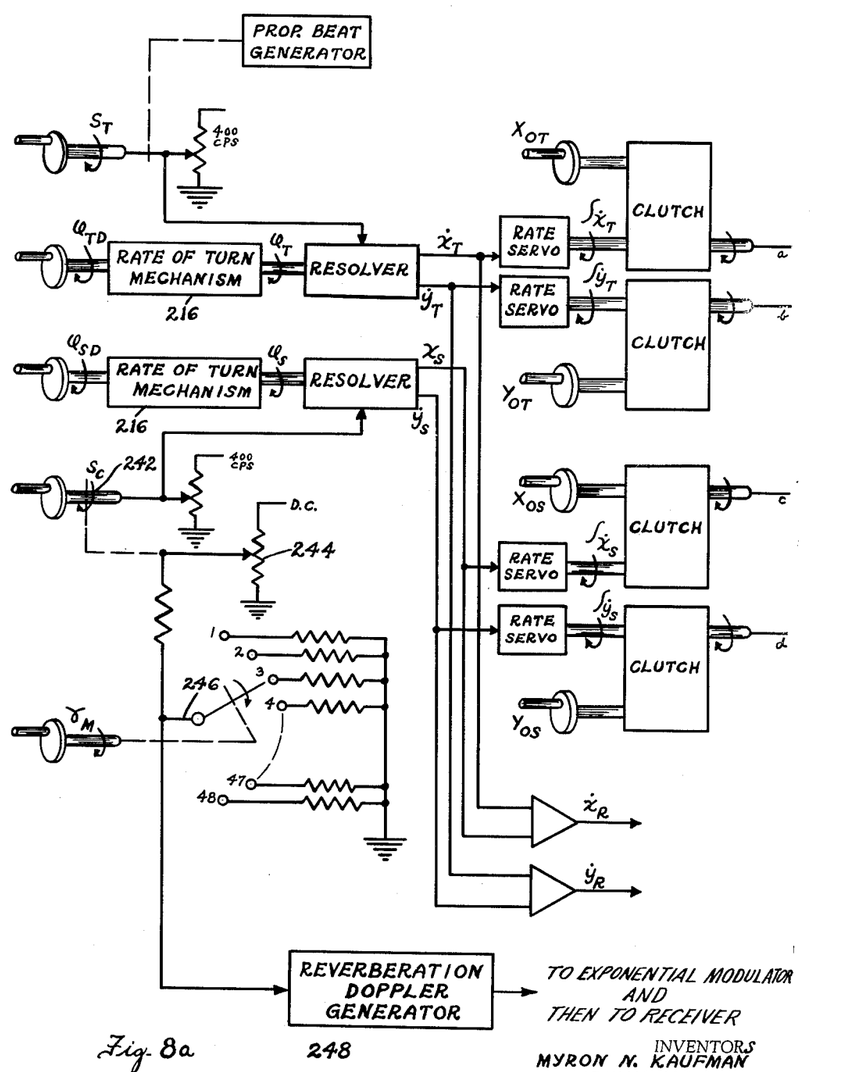
FIGS. 8a and 8b is a block diagram of the target echo generator.
Figure 8B:
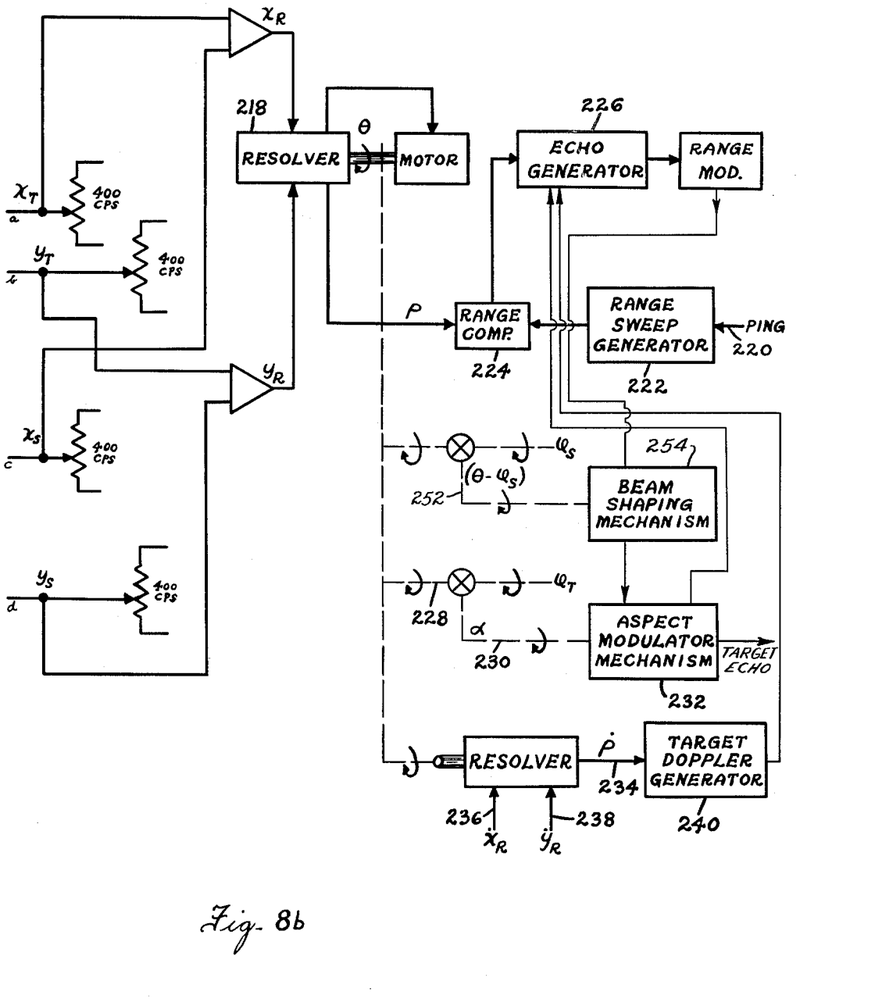

The basic difference between the target echo generator and previously developed target echo generators lies in the generation of the relative North-South, East-West target position. Because it is required to generate absolute target and Own Ship position information in order to store absolute track information to accommodate the non-stationary sonar, two additional integrating rate servos are required in this implementation. The implementation shown in FIGS. 8a and 8b integrates the velocity vectors, for each ship (i.e. target and Own-Ship) and sums the displacement East-West and North-South as shown to generate the relative position of target to Own Ship before proceeding with the translation of the rectangular coordinates to the $\rho-\theta$ polar coordinates. It should be noted that the implementation shown both for the target echo and the wake echo considers only a two dimensional problem. The techniques advanced, however, are applicable to three dimensional trajectories, if required. The effects that may be simulated for the target echo and general simulation of the sonar problem are indicated in FIGS. 8a and 8b. Included in the block diagram are rate of turn mechanisms 216, which simulate a realistic rate of turn predetermined by the instructor so that sharp angled turns or about face situations with target or Own Ship are not possible.

The general technique for simulating both the beam shaping and bearing comparison in unit 254 is as follows: a single pole multi-position commutator 252 with as many positions as there are transducer sections in the sonar is positioned by the difference between the bearing angle $\theta$ and the Own Ship heading angle $\phi_s$. This being the case, it is evident that if a target echo pulse is injected into the commutator brush, the particular commutator segment in contact with the brush will in fact simulate the particular transducer section which would be energized in an analogous field condition. The use of a single movable brush represents a realistic condition in a coarse manner. In order to refine this scheme it is necessary to:

(1) Simulate beam shape.
(2) Have adjacent beam shapes overlap.

In order to simulate beam shape the simulated echo signal is routed to the commutator through a potentiometer which is geared to the $(\theta-\phi_s)$ shaft 252 which moves one complete revolution each time the wiper arm moves one commutator segment. The potentiometer is multi-tapped and loaded so that the transfer function of the potentiometer as the commutator brush moves one segment traces out the average beam shape. Such an arrangement would simulate beam shape but would not provide adjacent transducer element overlap. In order to achieve this effect two mechanically connected brushes are arranged on the single commutator, the brushes, however, being electrically independent. Each brush has associated with it a beam shaping potentiometer as described above in such a manner that two adjacent energized commutator segments are possible with different amplitudes according to the position of the associated potentiometer. Signals brought to the commutator through the brushes via the beam shaping potentiometer are routed to the audio display via an operator controlled remote positioning switch. The commutators are scanned at the PPI rate with appropriate gating networks for the output which is routed to the video display.

In synchronism with the sonar ping 220 which is derived from the sonar receiver a range sweep is generated by generator 222 which lasts an appropriate time corresponding to the up and back transmission of sound waves corresponding to the operator controlled range setting. Also generated in synchronism with the ping time is a decreasing function, the shape of which is based on the attenuation of target echoes as a function of range. The 400 cycle target range voltage, $\rho$, generated in the resolver servo 218 shown in FIGS. 8a and 8b is detected and compared at 224 to the linear range sweep. At coincidence, a trigger is generated which fires a monostable multivibrator (echo generator 226), the width of whose pulse is modulated by the aspect angle $\alpha$. This video type echo is used to gate the range modulation voltage and the resulting output is a signal whose amplitude varies depending on when the video echo is generated relative to the ping. In this fashion the range modulation is imposed on the video echo generated.

As indicated previously the width of the echo generator pulse is determined by the aspect angle $\alpha$ which is derived as a shaft position $(\theta-\phi_T)$. This $\alpha$ shaft 230 is tied to a potentiometer which controls the on time of the echo generator. In addition, after the range modulated video pulse is generated, it is passed through a second potentiometer in the aspect modulator mechanism 232, the shaft position of which is controlled by $\alpha$ which atenuates the video echo as a function of the aspect angle. In this fashion the aspect effect on the target echo width and amplitude is achieved.

The echo Doppler frequency is determined by the rate of change of the target range (i.e. $\dot{\rho}234$) derived from the bearing angle and the relative East-West, North-South velocity vectors $\dot{x}_r$ 236 and $\dot{y}_r$ 238. The implementation of $\dot{\rho}234$ is as shown in FIGS. 8a and 8b and requires a resolver and the relative target velocity vectors as A.C. analog voltages. The 400 cycle resolver output $\dot{\rho}234$ is detected and coupled to a reactance tube oscillator. Since the Doppler shift is directly related to $\dot{\rho}234$, the use of an ordinary reactance tube oscillator would not give accurate simulation of Doppler frequencies since this arrangement would result in a non-linear relationship between a rate of change of range and the frequency shift. As a result a feedback system is used where the output of the reactance tube oscillator is fed, via a limiter circuit, to a linear discriminator, the output of which is fed through a buffer amplifier back into the reactance tube. This is done in the target Doppler generator 240.

In this manner the relationship between $\rho$ and Doppler shift is maintained linear, within the linearity of the discriminator.

The reverberation from the surface or from a shallow bottom has an envelope which is an exponentionally decreasing function which is maximum at ping time and decays to a nondiscernible level. The reverberation frequency depends on the relationship between the listening angle and the heading of the Own Ship. When the listening angle and heading angle are identical the maximum doppler upshift is generated. When there is a 180° difference between the heading angle and the listening angle then the maximum downshift results. A 90° relationship between the heading angle and the listening angle results in no Doppler shift at all. In FIGS. 8a and 8b, the technique for generating the reverberation Doppler frequency is indicated. It is obvious that in addition to the relationship between the heading angle and the listening angle, the speed of the Own Ship directly affects the Doppler shift. From FIGS. 8a and 8b it may be seen that the input speed shaft 242 is tied to a D.C. potentiometer 244, the output of which is passed to a resistance attenuator 246. This attenuator has 48 positions which correspond to any of the 48 listening positions of the directional sonar receiver. Each one of these positions represents a particular attenuation of the speed voltage and in fact the voltage taken from the wiper arm of the single pole multi position switch shown is the Own Ship speed multiplied by the cosine of the student's angle relative to the bow of the Own Ship $\gamma m$. The output from this voltage divider is passed into the reverberation Doppler generator 248 which is, as described for the target Doppler generator, a reactance tube oscillator and discriminator combination which results in a linear variation of frequency as a function of the linear change in the D.C. input voltage. This frequency modulated sine wave is amplitude modulated by the exponentially decaying reverberation envelope discussed previously and the resultant signal is used to represent the audio display reverberation noises. The video reverberation noises have the same envelope shape as described for the audio; however, the carrier is not frequency modulated since Doppler shifts are not intelligible on the video display. The frequency of the carrier for the video display is different depending on the channel allocation for the particular sonar.

Various types of random noise are required, which may be generated electronically. A white noise generator generating broad band noise is required, to simulate the various sea state levels simply by having an instructor controlled switch introducing various levels of noise corresponding to the individual sea states required. This same wide band white noise generator is used for generating the towing noise due to the drag of the water on the transducer casing. This noise would have to be modulated as a function of the Own Ship's speed, which is easily accomplished. The low frequency random modulation of echoes due to non homogeneities of the water temperature and other refraction considerations may be duplicated by narrow banding the available white noise and achieving a very low frequency random signal which amplitude modulates at a fixed average level the simulated sonar signal. Other noises which may be generated include propeller beats, the characteristics of which are determined by the functional target speed.

Obviously many modifications and variations of the present invention are possible in the light of the above teachings. It is therefore to be understood that within the scope of the appended claim the invention may be practiced otherwise than as specifically described.

What is claimed is:

A wake simulator for simulating the display results produced by sonar equipment aboard one's own ship when the sonar equipment thereon picks up echoes from the wake of a target vessel comprising, in combination:
    means for deriving a first signal corresponding to a range-attenuated wake echo signal;
    means for deriving a second signal having a variable parameter characteristic of the age of a wake;
    means for deriving a third signal having a variable parameter characteristic of the aspect angle of a wake;
    means for deriving a fourth signal having a variable parameter characteristic of own-ship's speed with respect to a wake; and
    means, to which said four signals are fed, for combining said wake echo signal with said other three signals to obtain an output signal which corresponds to that obtained from a real wake by sonar equipment mounted aboard a marine vessel.

References Cited by the Examiner
UNITED STATES PATENTS

| | | | |
|---|---|---|---|
| 2,863,227 | 12/58 | Chubb et al. | 35—10.4 |
| 2,969,599 | 1/61 | Nye et al. | 35—10.4 |
| 3,008,244 | 11/61 | Lindley | 35—10.4 |

CHESTER L. JUSTUS, *Primary Examiner.*
MAYNARD R. WILBUR, *Examiner.*